(12) United States Patent
Bochkarev

(10) Patent No.: US 7,483,187 B2
(45) Date of Patent: Jan. 27, 2009

(54) METHOD AND APPARATUS OF ADJUSTING IMAGE TONE AND GRAPHIC USER INTERFACE FOR THE SAME

(75) Inventor: Serafim Bochkarev, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 993 days.

(21) Appl. No.: 10/611,421

(22) Filed: Jul. 2, 2003

(65) Prior Publication Data
US 2004/0057061 A1 Mar. 25, 2004

(30) Foreign Application Priority Data
Jul. 2, 2002 (KR) .................. 10-2002-0037867

(51) Int. Cl.
G03F 3/08 (2006.01)
G06F 15/00 (2006.01)
G06K 9/00 (2006.01)

(52) U.S. Cl. .................. 358/519; 358/1.9; 382/167

(58) Field of Classification Search ............ 358/1.9, 358/518, 519, 520, 537, 1.1, 523, 530, 504, 358/1.13; 382/167, 162
See application file for complete search history.

(56) References Cited

U.S. PATENT DOCUMENTS

| | | | | |
|---|---|---|---|---|
| 4,996,591 A | * | 2/1991 | Kadowaki et al. | 358/519 |
| 5,363,318 A | * | 11/1994 | McCauley | 702/85 |
| 5,546,101 A | | 8/1996 | Sugawara | 345/63 |
| 5,710,827 A | * | 1/1998 | Perumal et al. | 382/167 |
| 5,982,379 A | * | 11/1999 | Suzuki et al. | 345/593 |
| 6,160,968 A | * | 12/2000 | Noda | 399/8 |
| 6,462,835 B1 | * | 10/2002 | Loushin et al. | 358/1.9 |
| 6,686,953 B1 | * | 2/2004 | Holmes | 348/179 |
| 6,721,066 B2 | * | 4/2004 | Hirota et al. | 358/1.9 |
| 2002/0070948 A1 | * | 6/2002 | Murai et al. | 345/589 |
| 2002/0135683 A1 | * | 9/2002 | Tamama et al. | 348/222 |
| 2003/0043410 A1 | * | 3/2003 | Fukawa et al. | 358/2.1 |
| 2003/0047099 A1 | * | 3/2003 | Hanyu | 101/484 |
| 2003/0222998 A1 | * | 12/2003 | Yamauchi et al. | 348/262 |
| 2004/0196480 A1 | * | 10/2004 | Foster et al. | 358/1.9 |
| 2006/0203298 A1 | * | 9/2006 | Kuwata et al. | 358/448 |

FOREIGN PATENT DOCUMENTS

| | | |
|---|---|---|
| KR | 2000-10958 | 2/2000 |
| KR | 2002-41698 | 6/2003 |

OTHER PUBLICATIONS

Office Action dated Jun. 10, 2005 from the corresponding Chinese Patent Application No. 03151490.1.

* cited by examiner

Primary Examiner—Madeleine A Nguyen
(74) Attorney, Agent, or Firm—Staas & Halsey LLP (57) ABSTRACT

An apparatus and method thereof adjust tonal characteristics of an image to a printer. The apparatus includes a storage unit storing a color correction scheme using a color gamma curve varying in accordance with variable values comprising locations of first and second internal points on the color gamma curve and a gamma coefficient, and a variable input unit receiving the variable values. The apparatus further includes a tone adjusting unit adjusting the tonal characteristics of the image by reflecting the variable values in the color correction scheme and generating bitmap data as a result of the adjustment of the tonal characteristics, and outputting the bitmap data to the printer.

16 Claims, 8 Drawing Sheets

METHOD AND APPARATUS OF ADJUSTING IMAGE TONE AND GRAPHIC USER INTERFACE FOR THE SAME

CROSS-REFERENCE TO RELATED APPLICATIONS

This application claims the priority of Korean Patent Application No. 2002-37867, filed Jul. 2, 2002, in the Korean Intellectual Property Office, the disclosure of which is incorporated herein by reference.

BACKGROUND OF THE INVENTION

1. Field of the Invention

The present invention relates to a method and an apparatus of adjusting the tonal characteristics of a color or gray scale image and a graphic user interface for the same, and more particularly, to a method and an apparatus of adjusting the tonal characteristics of a color or gray scale original image and a graphic user interface where a minimum number of variables are used.

2. Description of the Related Art

In general, when a color or gray scale original image is input from an input device, such as a scanner or a multifunction peripheral, a user may vary chromatic characteristics or tonal characteristics of the original image before printing the original image using an output device, such as a printer or a multifunction peripheral. Because a printer driver or firmware of the printer only provides very simple options, such as a function to set a general sharpness of the image including text, graphics, or photographs, an additional graphic program, such as Adobe Photoshop or Corel Photopaint, is necessary for the user to change the chromatic characteristics or the tonal characteristics of the original image to the extent to which the user desires.

Such a graphic program provides various functions for adjusting the chromatic characteristics or the tonal characteristics of the original image, including a level function and a curve function. According to the level function, a distribution of brightness of portions of the original image is represented by a histogram. Thereafter, portions of the original image are classified into a shadow region, a middle tone region, and a highlighted region. A clear image is obtained by adjusting the brightness and a contrast of the original image taking the classified region into consideration. Therefore, the level function enables the user to adjust the brightness and the contrast of the original image more precisely than a brightness/contrast function for adjusting the overall brightness and contrast of the original image.

The curve function helps the user adjust the chromatic characteristics or tonal characteristics of the original image even more precisely than the level function. According to the curve function, the brightness and the contrast of the image are freely adjusted by arbitrarily changing a color gamma curve so that the brightness and the contrast of the shadow region, the middle tone region, and the highlighted region can be individually adjusted. In addition, the curve function enables the brightness and the contrast of the original image to be adjusted on a channel basis and the color of the original image to be adjusted directly on the image. The user can change a shape of a color gamma curve provided in a graphic user interface for the curve function by dragging the color gamma curve toward a predetermined direction using a pointing device, such as a mouse, or drawing a new color gamma curve having a desired form using a pen tool, and by doing so, the user can adjust the brightness and the contrast of the original image.

However, in general, the graphic user interface provided by the conventional graphic program includes many variables necessary to change the shape of the color gamma curve. The shape of the color gamma curve responds to the manipulation of the pointing device so sensitively that even an expert user as well as an inexperienced user may have difficulty in using the pointing device to change the shape of the color gamma curve. In addition, in the conventional method of adjusting the color or the gray scale of the image, because an additional graphic program is necessary to adjust the chromatic characteristics or the tonal characteristics of the original image, frequently adjusting the chromatic characteristics or the tonal characteristics causes an inconvenience to the user and it is difficult to adjust the chromatic characteristics or the tonal characteristics at a high speed.

Furthermore, U.S. Pat. No. 5,898,436 discloses a graphical user interface for digital image editing, in which the chromatic adjustments to an overall color balance of the image are presented on one screen and the tonal adjustments are presented on another screen. Each adjustment is displayed as a pair of preview images which respectively show the effect of the associated variable in a real time. U.S. Pat. No. 5,424,754 discloses a method and apparatus for color processing of the image displayed on a display device in a computer controlled display system, in which a display screen includes a window displaying a user image, a window displaying a reference image, a window for analog color controls and a window displaying variants. The user can modify the color of the image displayed on the display device easily and conveniently using either the analog color controls or the variants.

SUMMARY OF THE INVENTION

The present invention provides a method of adjusting tonal characteristics of an image enabling a user to easily and conveniently adjust the tonal characteristics of the image with simple manipulations by minimizing a number of parameters in a color gamma curve that are necessary for the user to manipulate and an apparatus therefor.

The present invention also provides a graphic user interface for the method of adjusting the tonal characteristics of the image, which promotes user convenience.

According to an aspect of the present invention, there is provided a method of adjusting tonal characteristics of an image, including preparing a color correction scheme using a color gamma curve modified in accordance with variable values including locations of first and second internal points on the color gamma curve and a gamma coefficient; receiving the variable values from a user; and adjusting the tonal characteristics of the image by reflecting the variable values in the color correction scheme.

According to another aspect of the present invention, there is provided an apparatus of adjusting tonal characteristics of an image, including a storage unit storing a color correction scheme using a color gamma curve modified in accordance with variable values including locations of first and second internal points on the color gamma curve and a gamma coefficient; a variable input unit receiving the variable values from a user; and a tone adjusting unit adjusting the tonal characteristics of the image by reflecting the variable values in the color correction scheme and generating bitmap data as a result of the adjustment and outputting a signal to a printer indicative thereof.

According to still another aspect of the present invention, there is provided a graphic user interface adjusting tonal characteristics of an image, including: a first window having tone values of the image arranged along an X-axis and tone values of an adjusted image arranged along a Y-axis and including a color gamma curve, the color gamma curve includes first and second internal points moving along the color gamma curve, and a third internal point moving diagonally with respect to the color gamma curve; a first variable input portion including a first control button corresponding to a first editing box and expressing a gamma coefficient value for a predetermined location of the third internal point; and second through fifth variable input portions including second through fifth control buttons, respectively, corresponding to second through fifth editing boxes, respectively, and expressing coordinate values of the first and second internal points existing on the color gamma curve.

According to an aspect of the present invention, there is provided an apparatus to adjust tonal characteristics of an image, including: a manipulating unit inputting variable values to edit the image; a display unit displaying the image; and an image processing unit reading an image correction scheme and adjusting the tonal characteristic of the image based on the variable values and a gamma coefficient, and converting the tone-adjusted image into bitmap data and outputting a signal indicative thereof.

According to an aspect of the present invention, there is provided a method of adjusting tonal characteristics of an image for a printer, including: inputting variable values to edit the image; displaying the image; and reading an image correction scheme and adjusting the tonal characteristic of the image based on the variable values and a gamma coefficient, and converting the tone-adjusted image into bitmap data and outputting a signal indicative thereof.

According to an aspect of the present invention, there is provided a computer-readable recording medium on which a computer-readable program adjusts tonal characteristics of an image, including: inputting variable values to edit the image; displaying the image; and reading an image correction scheme and adjusting the tonal characteristic of the image based on the variable values and a gamma coefficient, and converting the tone-adjusted image into bitmap data and outputting a signal indicative thereof.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present aspects of the present invention, examples of which are illustrated in the accompanying drawings, wherein like reference numerals refer to like elements throughout.

Figure 1:
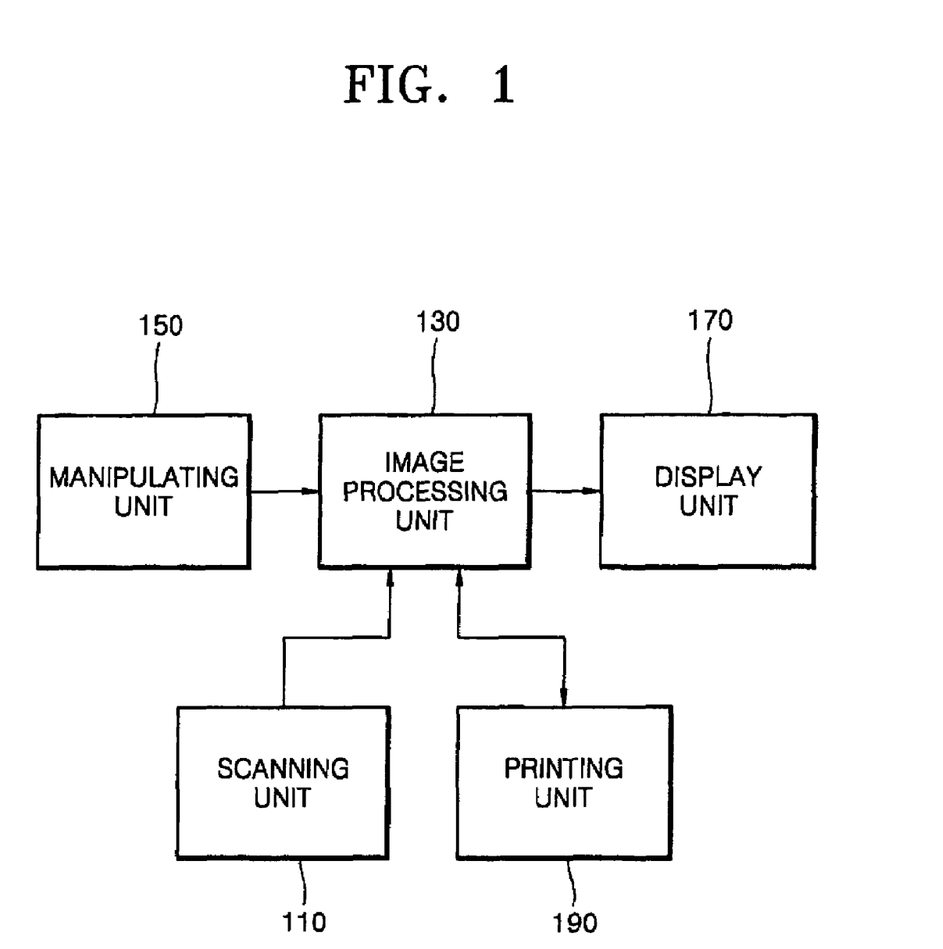
FIG. 1 is a block diagram showing a configuration of an apparatus to adjust tonal characteristics of an image, according to an aspect of the present invention.

FIG. 1 is a block diagram showing a configuration of an apparatus to adjust tonal characteristics of an original image, according to an aspect of the present invention. The apparatus includes a scanning unit 110, an image processing unit 130, a manipulating unit 150, a display unit 170 and a printing unit 190.

Referring to FIG. 1, the original image input from the scanning unit 110 is displayed on the display unit 170 via the image processing unit 130. In order to edit the original image displayed on the display unit 170, a user displays through a graphical user interface, the image for image editing on the display unit 170. Variable values for the image editing are input by means of the manipulating unit 150 such as a mouse, a keyboard, or a touch panel. A scheme to edit the original image depending on predefined variables is preprogrammed and stored in the image processing unit 130. A preprogrammed image editing scheme may be in a form of either a printer driver or firmware of the printing unit 190. The image processing unit 130 adjusts the tonal characteristics, such as brightness or contrast of the original image using the image editing scheme so as to correspond to the input variable values. The tone-adjusted image is provided to the display unit 170 and/or the printing unit 190.

Figure 2:
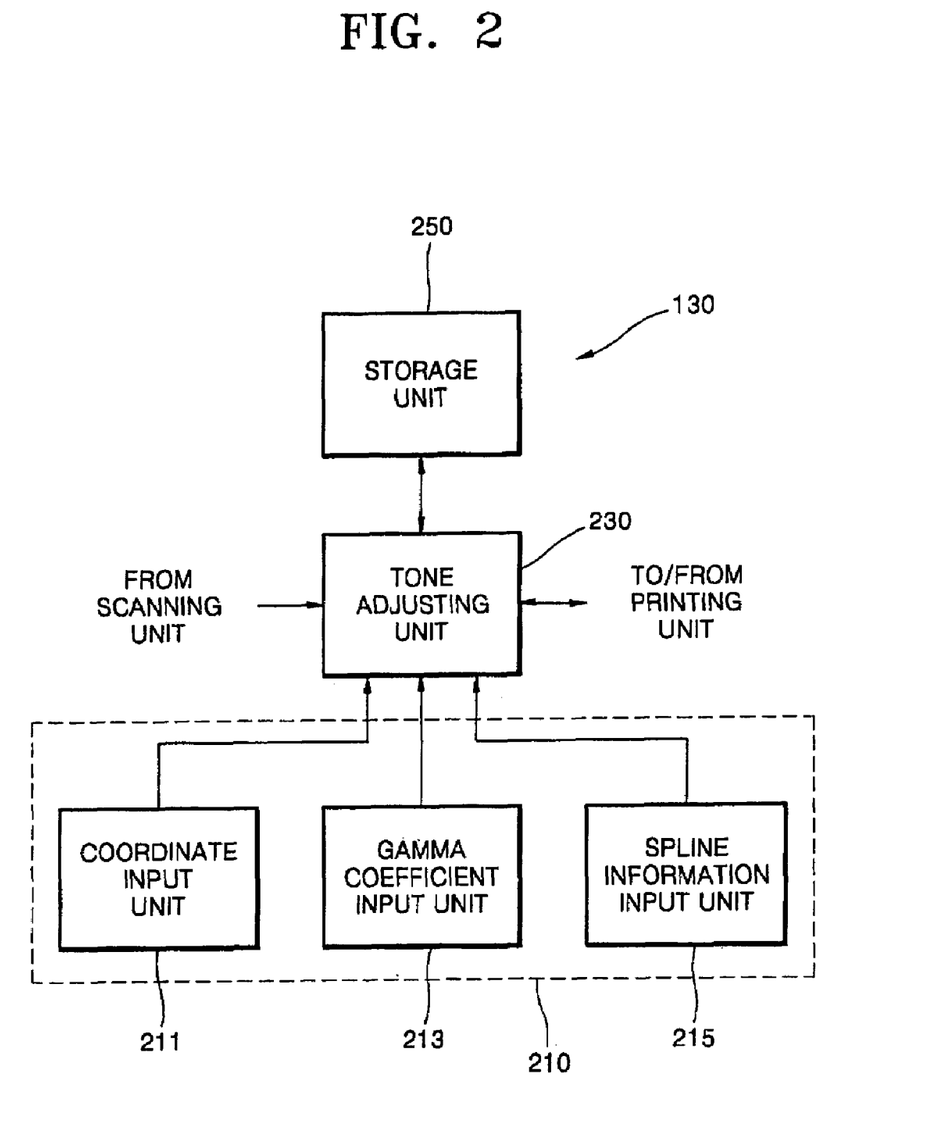
FIG. 2 is a detailed block diagram of an image processing unit shown in FIG. 1.

FIG. 2 is a detailed block diagram of the image processing unit 130 shown in FIG. 1, where the image editing scheme stored in the image processing unit 130 is an image correction scheme for tone adjusting. The image processing unit 130 includes a variable input unit 210 including a coordinate input unit 211, a gamma coefficient input unit 213, and a spline information input unit 215, a tone adjusting unit 230, and a storage unit 250.

Referring to FIG. 2, the coordinate input unit 211 inputs first and second coordinate values to change the shape of the color gamma curve to be provided to the tone adjusting unit 230. The gamma coefficient input unit 213 inputs a gamma coefficient for gamma correction, which is then provided to the tone adjusting unit 230. The spline information input unit 215 may be optionally provided to receive and input spline information regarding whether a spline correction is performed or not, and to output a signal indicative thereof to the tone adjusting unit 230.

The tone adjusting unit 230 reads an image correction scheme for the tone adjusting, which is stored in the storage unit 250 or the printing unit 190, and adjusts the tonal characteristic of the original image input from the scanning unit 110, depending on the variable values provided from the coordinate input unit 211, gamma coefficient input unit 213, and spline information input unit 215. The tone-adjusted original image is converted into bitmap data and is provided to the printing unit 190.

Figure 3:
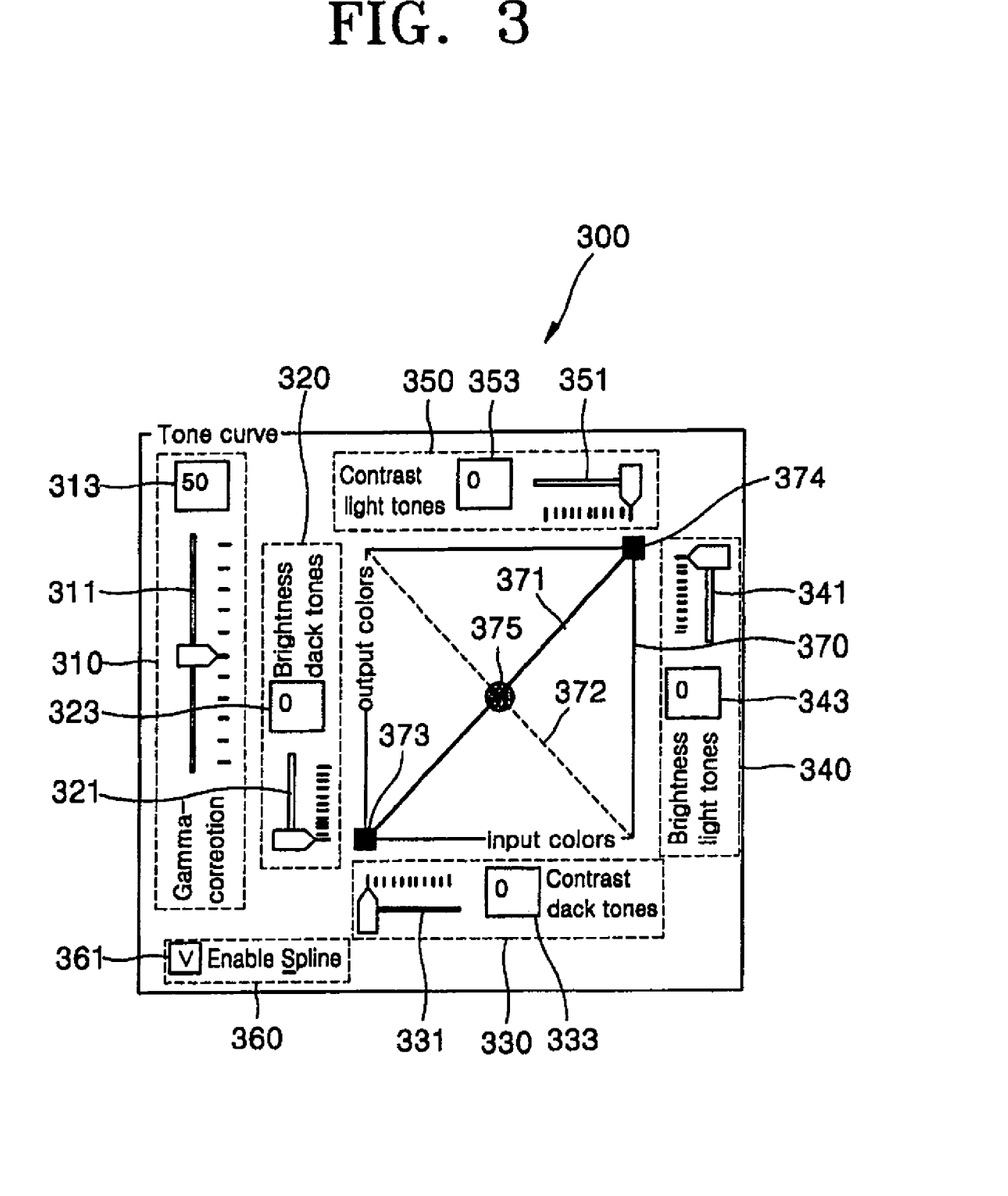
FIG. 3 is a diagram illustrating a screen display showing a graphic user interface to adjust the tonal characteristics of the image according to an aspect of the present invention.
Figure 5:
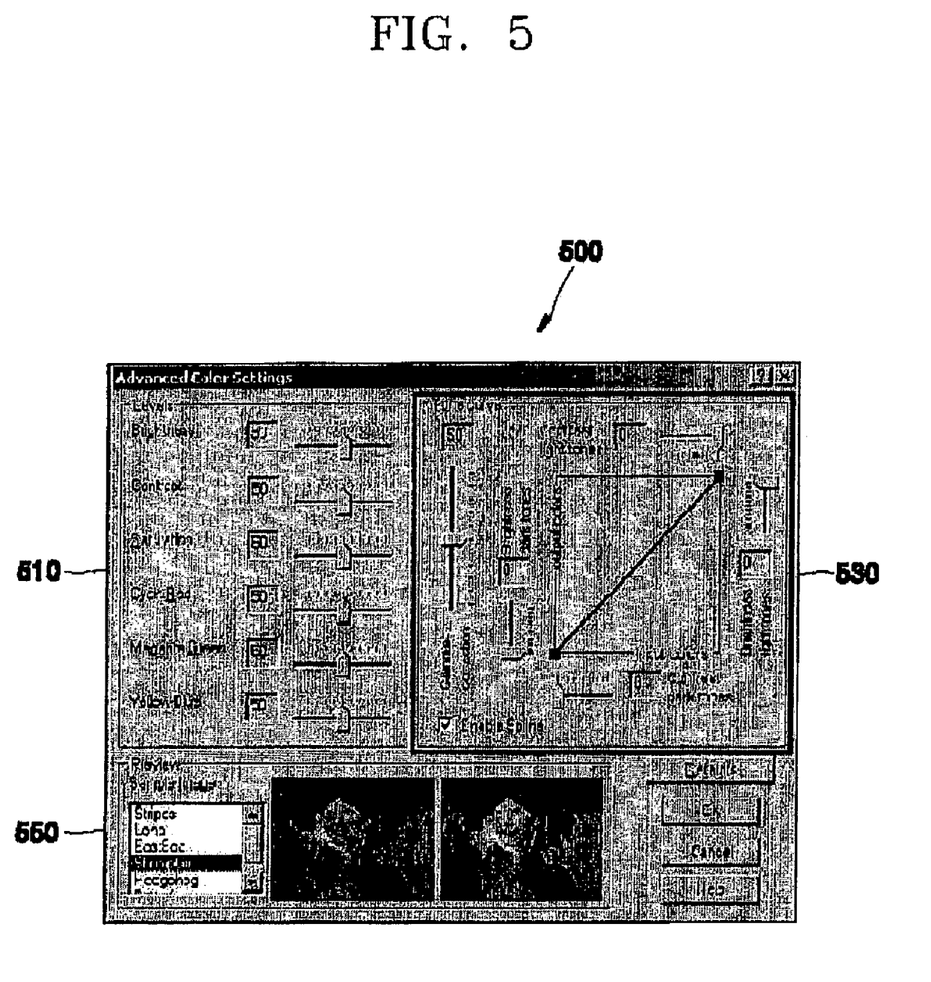
FIG. 5 is a diagram illustrating a screen display showing all color setting options including a graphic user interface of the method to adjust the tonal characteristics of the image, according to an aspect of the present invention.

FIG. 3 is a diagram illustrating a screen display showing a graphic user interface to adjust the tonal characteristics of the image, according to an aspect of the present invention. Referring to FIG. 3, the graphic user interface 300 represented by "tone curve" includes a gamma coefficient input portion 310, first coordinate input portions 320 and 330 showing coordinates of a first internal point 373, second coordinate input portions 340 and 350 showing coordinates of a second internal point 374, a spline information input portion 360 via which information about the spline correction can be input, and a first window 370. The spline information input portion 360 may not be included in the graphic user interface 300. For instance, the graphic user interface 300 may include a preview window (550 of FIG. 5) through which an original image is displayed with the image that has been adjusted by changing a shape of a color gamma curve 371, as shown in FIG. 5.

Here, the gamma coefficient input portion 310, the first coordinate input portions 320 and 330, and the second coordinate input portions 340 and 350 include first, second, third, fourth, and fifth control buttons 311, 321, 331, 341, and 351 with text indicating the purpose for each control button, respectively, and first, second, third, fourth, and fifth editing boxes 313, 323, 333, 343, and 353, respectively. The spline information input portion 360 includes a check box 361 and text indicating the purposes for the check box 361. The control buttons 311, 321, 331, 341, and 351 take a form of a slider bar or a scroll bar.

Tone values of the original image are shown on a horizontal axis of the first window 370, and the tone values of the adjusted image are shown on a vertical axis of the first window 370. In the first window 370, the color gamma curve 371 is placed having a pair of minimum tone values of the original image and the adjusted image, respectively, as a starting point, and a pair of maximum tone values of the original image and the adjusted image, respectively, as an ending point. A third internal point 375 is placed at an intersection of the color gamma curve 371 and a diagonal line 372 of the first window 370. Here, the color gamma curve 371 is a tone curve in which input and output tone values are mapped and the location of the third internal point 375 corresponds to the gamma coefficient. The first and second internal points 373 and 374 are placed on the color gamma curve 371. The coordinate values of the first internal point 373 gradually increase from the coordinate values of the starting point, i.e., a minimum input tone value and a minimum output tone value, and the coordinate values of the second internal point 374 gradually decrease from the coordinate values of the ending point, i.e., a maximum input tone value and a maximum output tone value.

The first control button 311 and the first editing box 313 define the gamma coefficient, the second control button 321 and the second editing box 323 define a horizontal axis coordinate of the first internal point 373, and the third control button 331 and the third editing box 333 define a vertical axis coordinate of the first internal point 373. In addition, the fourth control button 341 and the fourth editing box 343 define the vertical axis coordinate of the second internal point 374, and the fifth control button 351 and the fifth editing box 353 define the vertical axis coordinate of the second internal point 374.

Here, the first internal point 373 is programmed in a position that is lower and to the left of the second internal point 374 on the color gamma curve 371. In addition, the first internal point 373, the second internal point 374, and the third internal point 375 are programmed so that the first internal point 373 moves along the color gamma curve 371 from left to right and from bottom to top. The second internal point 374 moves along the color gamma curve 371 from right to left and from top to bottom, and the third internal point 375 moves along the diagonal line 372.

It is possible to prevent a negative picture phenomenon or a middle tone inversion phenomenon, which often occurs when performing a curve function of an image editing program, such as Photoshop or Photopaint, by programming the first and second internal points 373 and 374 so that relative locations of the first internal point 373 and the second internal point 374 with respect to each other can be set up and movement paths of the first and second internal points 373 and 374 can be limited to some extent. In other words, the user can enhance a sharpness of the original image to some extent by changing the locations of the first and second internal points 373 and 374.

The graphic user interface 300 may be controlled by using a keyboard or a mouse. For example, the first through third internal points 373, 374, and 375 can be controlled by using the mouse, the control buttons 311, 321, 331, 341, and 351 and the check box 361 can be controlled by using either the mouse or the keyboard, and the editing boxes 313, 323, 333, 343, and 353 can be controlled by using the keyboard. Such control buttons, editing boxes, and check boxes are widely used in graphic operating systems, and thus, their operations are understood by those skilled in the art.

The user can vary a shape of the color gamma curve 371 by moving the first and second internal points 373 and 374 along the color gamma curve 371 and moving the third internal point 375 along the diagonal line 372, by inputting predetermined values into the first through fifth editing boxes 313, 323, 333, 343, and 353, or by controlling the first, second, third, fourth, and fifth control buttons 311, 321, 331, 341, and 351. Values of the first through fifth editing boxes 313, 323, 333, 343, and 353 may be varied by the user moving the first through third internal points 373 through 375 or manipulating the first through fifth control buttons 311, 321, 331, 341, and 351.

Figure 4:
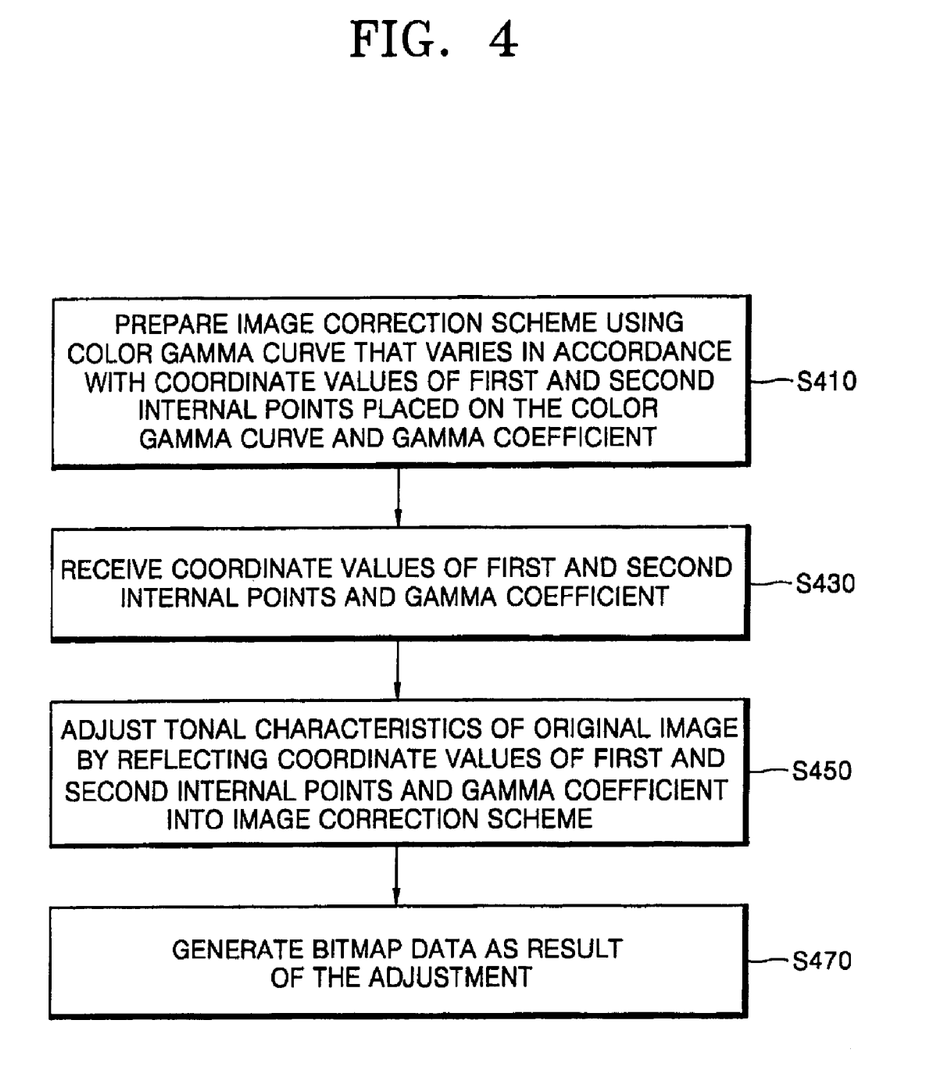
FIG. 4 is a flowchart of a method to adjust the tonal characteristics of the image, according to an aspect of the present invention.

FIG. 4 is a flowchart of a method of adjusting the tonal characteristics of the image, according to an aspect of the present invention. Referring to FIG. 4, at operation S410, the image correction scheme for the tone adjusting is prepared using the color gamma curve 371, which varies depending on the gamma coefficient and coordinate values of the first and second internal points placed on the color gamma curve and the image correction scheme is stored in a predetermined storage medium.

At operation S430, the user inputs the coordinate values of the first and second internal points and the gamma coefficient using the gamma coefficient input portion 310 and the first and second coordinate input portions 320 through 350 on the graphical user interface 300.

At operation S450, the tonal characteristics of the original image are adjusted by reflecting the input coordinate values of the first and second internal points and the input gamma coefficient in the image correction scheme for the tone adjusting prepared in operation S410. Thereafter, bitmap data is generated as a result of the adjustment of operation S470 to then be provided to an image output device, such as the printing unit 190. Preferably, the variables used in operations S410, S430, and S450 further include information of the spline correction of the color gamma curve.

In a first aspect of the present invention, the image correction scheme for the tone adjusting prepared in operation S410 is realized as the image processing unit 130 connected to the printer, for example, a printer driver, which is software operating in a computer system connected to the printer. At operation S430, the coordinate values of the first and second internal points, the gamma coefficient, and the spline correction information are input into the printer driver via the graphic user interface 300 having the structure shown in FIG. 3. Thereafter, the tonal characteristics of the original image are adjusted at operation S450, by reflecting the coordinate values of the first and second internal points, the gamma coefficient, and the spline correction information in the image correction scheme and for the tone adjusting stored in the printer driver. Thereafter, bitmap data is generated as a result of the adjustment of operation S470. The bitmap data is transmitted from the printer driver to printer firmware.

In a second aspect of the present invention, like in the first aspect of the present invention, the image correction scheme for the tone adjusting prepared in operation S410 is realized as the printer driver, which is the software operating in the computer system connected to the printing system. At operation S430, the coordinate values of the first and second internal points, the gamma coefficient, and the spline correction information are input into the printer driver via the user interface of the printer. For doing so, a panel may be prepared in advance via the variable values necessary to change the shape of the color gamma curve and that are input into the printer driver. Thereafter, at operations S450 and S470, the variable values input via the user interface of the printer are uploaded on the printer driver, the tonal characteristics of the original image are processed based on the input variable values, and then, the bitmap data is generated as a result of the processing. The bitmap data is transmitted from the printer driver to the printer firmware.

In a third aspect of the present invention, the image correction scheme for the tone adjusting generated in operation S210, is prepared as the firmware and then stored in a controller of the printer. In this case, like in the second aspect of the present invention, at operation S430, the coordinate values of first and second internal points, the gamma coefficient, and the spline correction information are input into the printer via the graphic user interface of the printer driver or the user interface of a printer. At operations S450 and S470, the variable values input in operation S430 are transmitted to the printer firmware. The printer firmware adjusts the tonal characteristics of the original image by reflecting the variable values in the image correction scheme of tone adjusting and generates the bitmap data as a result of the adjustment.

FIG. 5 is a diagram showing the screen display of the color settings menu including the graphic user interface to adjust the tonal characteristics of the image, according to an aspect of the present invention. A color settings menu 500 includes a "levels" window 510, a "tone curve" window 530, and a "preview" window 550. Here, the "levels" window 510 may also be set up separately from the color settings menu 500.

Figure 6A:
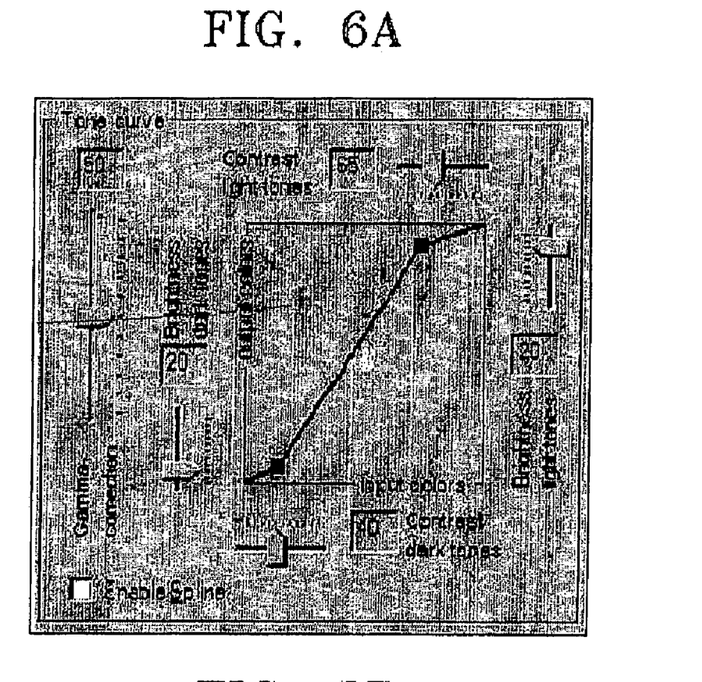
FIGS. 6A through 6C are diagrams each showing the color gamma curve in a graphic user interface having a varying shape depending on whether or not gamma correction is performed when spline correction is not performed in the method to adjust the tonal characteristics of the image, according to an aspect of the present invention.
Figure 6B:
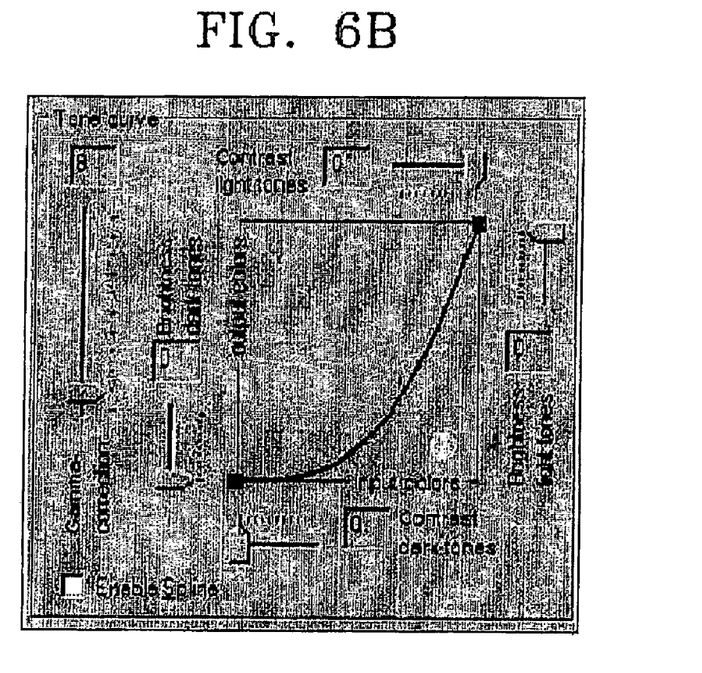
Figure 6C:
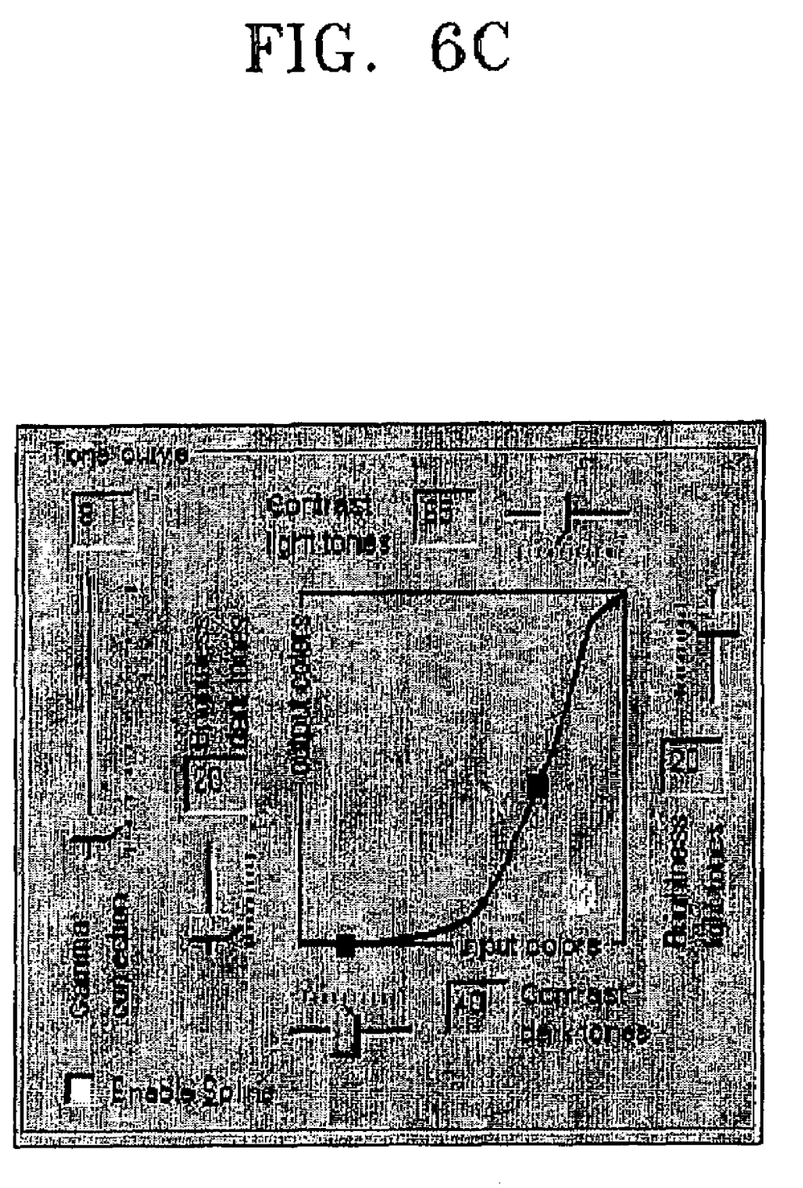

FIGS. 6A through 6C are diagrams, each showing the color gamma curve which is in the graphic user interface having a different shape depending on whether or not gamma correction has been performed under a circumstance where the spline correction has not been performed. In particular, FIG. 6A shows the color gamma curve obtained after performing the tone correction only, FIG. 6B shows the color gamma curve obtained after performing the gamma correction only, and FIG. 6C shows the color gamma curve obtained after performing both the tone and the gamma correction.

Figure 7A:
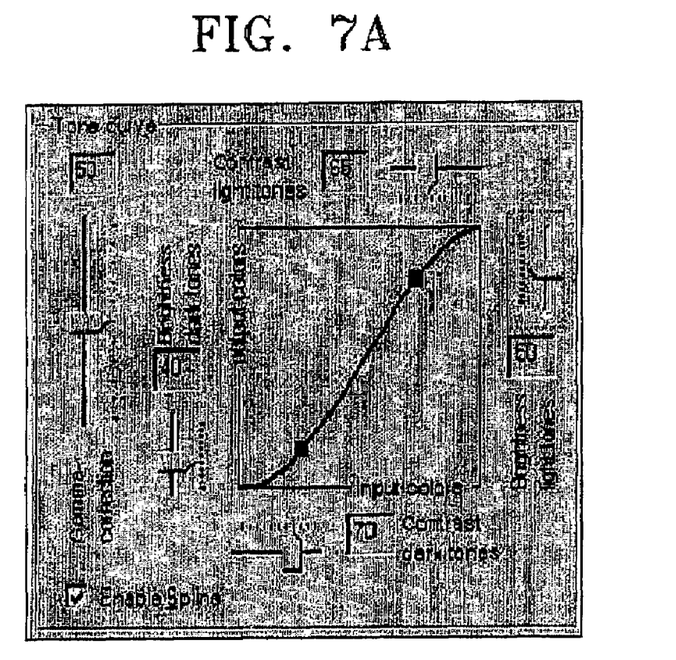
FIGS. 7A and 7B are diagrams each showing the color gamma curve in a graphic user interface having the varying shape depending on whether the gamma correction is performed when the spline correction is performed in the method to adjust the tonal characteristics of the image, according to an aspect of the present invention.
Figure 7B:
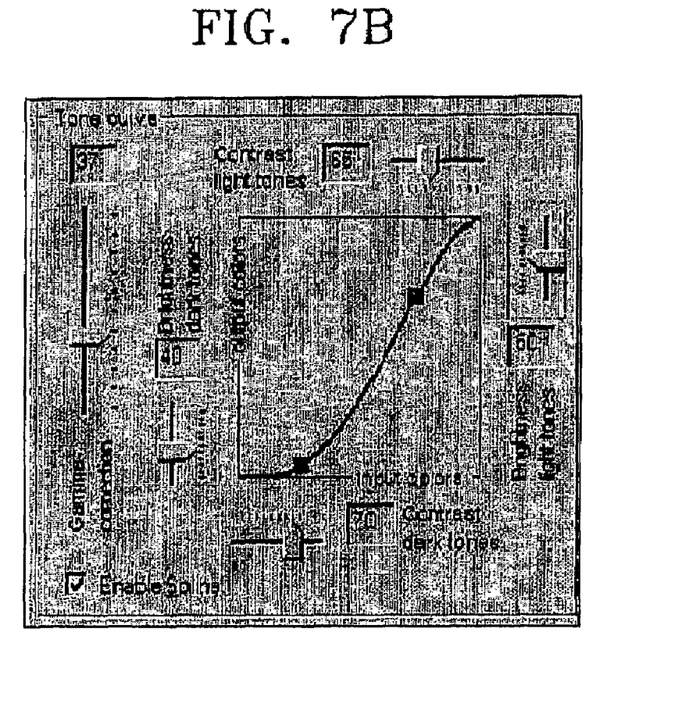

FIGS. 7A and 7B are diagrams each showing the color gamma curve in the graphic user interface having a varying shape depending on whether or not the gamma correction has been performed under a circumstance where the spline correction is performed. In particular, FIG. 6A shows the color gamma curve obtained after performing the tone correction, and FIG. 6B shows the color gamma curve obtained after performing the gamma and the tone correction.

As shown in FIG. 6A, in a case where only the tone correction is performed, the color gamma curve includes three straight line segments. In a case where only the gamma correction is performed, the color gamma curve having a shape of a normalized power function is obtained, i.e., the gamma function, as shown in FIG. 4B. In a case where the gamma correction and the tone correction are performed, the color gamma curve including the three curve segments is obtained, as shown in FIG. 6C. In a case where the tone correction and the spline correction are performed, the color gamma curve having an S-shaped curve is obtained, as shown in FIG. 7A. In a case where the gamma correction, the tone correction, and the spline correction are performed, the color gamma curve having a composite shape of the S-shape and the gamma function shape is obtained.

The above-described aspects of the present invention can be written as computer-readable programs and can also be realized in a digital computer using a computer-readable recording medium. The computer-readable recording medium includes a magnetic storage medium, such as a ROM, a floppy disk, or a hard disk, an optical storage medium, such as a CD-ROM or a DVD, and a carrier wave, such as data transmission through the Internet.

As described above, in a method of adjusting tonal characteristics of an original image and a graphic user interface therefore, according to an aspect of the present invention, a number of variables necessary to vary a shape of a color gamma curve is minimized, and thus, even a user who is not familiar with adjusting of the color gamma curve can precisely and easily adjust the tonal characteristics of the original image within a predetermined sharpness range.

In addition, because the method of adjusting the tonal characteristics of the image and the graphic user interface are realized as printer drivers or printer firmware, image processing speeds can be enhanced. Moreover, it is possible to promote a user convenience by providing various ways of inputting variable values necessary to adjust the tonal characteristics of an image.

Although a few aspects of the present invention have been shown and described, it will be appreciated by those skilled in the art that changes may be made in these aspects without departing from the principles and spirit of the invention, the scope of which is defined in the claims and their equivalents.

What is claimed is:

1. A method of adjusting tonal characteristics of an image for a printer, the method comprising:
preparing a color correction scheme using a color gamma curve varying in accordance with variable values comprising locations of first and second internal points on the color gamma curve and a gamma coefficient;
receiving the variable values as input from a user via a graphical user interface, the gamma coefficient being input to a gamma coefficient input portion of the graphical user interface; and
adjusting the tonal characteristics of the image by reflecting the input variable values in the color correction scheme.

2. The method of claim 1, further comprising:
generating bitmap data as a result of the adjustment of the tonal characteristics; and
outputting the bitmap data to the printer.

3. The method of claim 1, further comprising:
positioning the first internal point lower and to a left of the second internal point; and
programming the first and second internal points where the first internal point moves along the color gamma curve from left to right and from bottom to top and the second internal point moves along the color gamma curve from right to left and from top to bottom.

4. The method of claim 1, wherein the variable values comprise information on spline correction of the color gamma curve.

5. The method of claim 1, wherein the color correction scheme is programmed as one of a printer driver and firmware of a printer.

6. The method of claim 5, further comprising:
inputting the variable values via one of a graphic user interface of the printer driver and a user interface of the printer.

7. A computer-readable recording medium on which a computer-readable program adjusts tonal characteristics of an image using a method comprising:
preparing a color correction scheme using a color gamma curve varying in accordance with variable values comprising locations of first and second internal points on the color gamma curve and a gamma coefficient;
receiving the variable values as input from a user via a graphical user interface, the gamma coefficient being input to a gamma coefficient input portion of the graphical user interface; and
adjusting the tonal characteristics of the image by reflecting the input variable values in the color correction scheme.

8. The computer-readable recording medium of claim 7, further comprising:
positioning the first internal point lower and to a left of the second internal point; and
programming the first and second internal points where the first internal point moves along the color gamma curve from left to right and from bottom to top and the second internal point moves along the color gamma curve from right to left and from top to bottom.

9. An apparatus adjusting tonal characteristics of an image to a printer, comprising:
a storage unit storing a color correction scheme using a color gamma curve varying in accordance with variable values comprising locations of first and second internal points on the color gamma curve and a gamma coefficient;
a variable input unit receiving the variable values as input from a user via a graphical user interface including a gamma coefficient input portion; and
a tone adjusting unit adjusting the tonal characteristics of the image by reflecting the variable values in the color correction scheme and generating bitmap data as a result of the adjustment of the tonal characteristics, and outputting the bitmap data to the printer.

10. The apparatus of claim 9, wherein the first internal point is located in a position that is lower and to a left of the second internal point, and the first and second internal points are programmed where the first internal point moves along the color gamma curve from left to right and from bottom to top and the second internal point moves along the color gamma curve from right to left and from top to bottom.

11. The apparatus of claim 9, wherein the variable values comprise information of spline correction of the color gamma curve.

12. The apparatus of claim 9, wherein the storage unit stores the color correction scheme programmed as one of a printer driver and firmware of the printer.

13. The apparatus of claim 12, wherein the variable input unit receives the variable values via one of a graphic user interface of the printer driver and a user interface of the printer.

14. The apparatus of claim 9, wherein the graphical user interface further comprises a preview window displaying an original image, which has not been adjusted, next to an image that has been adjusted by changing a shape of the color gamma curve.

15. A method of adjusting tonal characteristics of an image for a printer, comprising:
preparing a color correction scheme using a color gamma curve varying in accordance with variable values comprising locations of first and second internal points on the color gamma curve, spline correction information and a gamma coefficient;
receiving the variable values as input from a user via a graphical user interface, the gamma coefficient being input to a gamma coefficient input portion of the graphical user interface and the spline correction information being input to a spline information input portion; and
adjusting the tonal characteristics of the image by reflecting the input variable values in the color correction scheme.

16. The method of claim 15, further comprising displaying an original image, which has not been adjusted, next to an image that has been adjusted by changing a shape of the color gamma curve.

* * * * *